United States Patent [19]
Soderlund et al.

[11] Patent Number: 6,126,823
[45] Date of Patent: Oct. 3, 2000

[54] SPIN-ON COOLANT FILTER

[75] Inventors: Mark Soderlund, Lakeville; Brent Gulsvig, Faribault; Daniel Roebbeke, Prior Lake, all of Minn.

[73] Assignee: Donaldson Company, Inc., Minneapolis, Minn.

[21] Appl. No.: 09/080,819

[22] Filed: May 18, 1998

[51] Int. Cl.⁷ .................................................. B01D 27/00
[52] U.S. Cl. .......................... 210/206; 210/209; 210/443; 210/450; 210/DIG. 17
[58] Field of Search .................................... 210/117, 136, 210/206, 209, 418, 440, 443, 444, 453, 450, DIG. 17; 277/918

[56] References Cited

U.S. PATENT DOCUMENTS

| | | |
|---|---|---|
| 3,297,162 | 1/1967 | Mouwen . |
| 3,357,563 | 12/1967 | Sicard ...................................... 210/209 |
| 3,397,786 | 8/1968 | Hultgren . |
| 3,469,697 | 9/1969 | Kudalty . |
| 3,529,722 | 9/1970 | Humbert, Jr. . |
| 3,822,787 | 7/1974 | Shaltis et al. . |
| 4,053,409 | 10/1977 | Kuhfuss, Jr. . |
| 4,222,875 | 9/1980 | Sikula, Jr. . |
| 4,364,825 | 12/1982 | Connor, Jr. . |
| 4,369,113 | 1/1983 | Stifelman . |
| 4,428,834 | 1/1984 | McBroom et al. . |
| 4,446,019 | 5/1984 | Robinson . |
| 4,480,160 | 10/1984 | Stifelman . |
| 4,512,882 | 4/1985 | Fischer et al. . |
| 4,522,712 | 6/1985 | Fischer et al. . |
| 4,611,627 | 9/1986 | Eidsvoog et al. . |
| 4,615,800 | 10/1986 | Stifelman et al. . |
| 4,738,776 | 4/1988 | Brown .............................. 210/DIG. 17 |
| 4,743,374 | 5/1988 | Stifelman . |
| 4,832,844 | 5/1989 | Ayers . |
| 4,834,885 | 5/1989 | Misgen et al. . |
| 4,853,118 | 8/1989 | Brownell et al. . |
| 4,872,976 | 10/1989 | Cudaback . |
| 4,883,083 | 11/1989 | Fisher et al. . |
| 4,935,127 | 6/1990 | Lowsky et al. . |
| 4,990,247 | 2/1991 | Vandenberk . |
| 5,037,539 | 8/1991 | Hutchins et al. . |
| 5,104,537 | 4/1992 | Stifelman et al. . |
| 5,258,118 | 11/1993 | Gouritin et al. ........................ 210/206 |
| 5,342,519 | 8/1994 | Friedmann et al. . |
| 5,395,518 | 3/1995 | Gulsvig . |
| 5,453,195 | 9/1995 | Jorgenson et al. ..................... 210/444 |
| 5,501,791 | 3/1996 | Theisen et al. . |

FOREIGN PATENT DOCUMENTS

| | | |
|---|---|---|
| 1023178 | 3/1966 | United Kingdom . |

*Primary Examiner*—Matthew O. Savage
*Attorney, Agent, or Firm*—Merchant & Gould P.C.

[57] ABSTRACT

A liquid filter apparatus includes a housing cup, end plate enclosing an end of the housing cup, a filter cartridge positioned within housing cup, and a gasket positioned between the filter cartridge and the end plate. The end plate has a gasket centering projection thereon. The gasket includes a centering depression positioned in engagement with the gasket centering projection of the end plate. The gasket may include a gasket for a lube filter, a gasket for a fuel filter, or a gasket for a coolant filter. A method for assembling a filter assembly includes steps of selecting a gasket from amongst a plurality of different shaped gaskets, and selecting a filter element from amongst a plurality of different filter elements. The gasket selected and the filter elements selected will depend upon the final intended application.

9 Claims, 8 Drawing Sheets

SPIN-ON COOLANT FILTER

FIELD OF THE INVENTION

The present invention relates to liquid filter arrangements. The invention particularly concerns methods and arrangements for sealing an enclosed filter element to an end plate in such arrangements.

BACKGROUND OF THE INVENTION

Fluid filters are used in a variety of systems. For example, they are used as oil lube filters, fuel filters, hydraulic fluid filters and coolant filters.

A common feature of typical liquid filter systems of the types used as the various fluid filters referenced in the previous paragraph, is that each generally involves an internal filter cartridge or element positioned within an outer housing, shell or can. The outer housing, shell or can generally has an open end with an end plate received therein. Typically, a portion of the housing is positioned over a portion of the end plate, to secure the end plate in position.

Typically, the filter cartridge is positioned between the end plate and an opposite end of the housing or container. In many instances, the filter element or cartridge is biased toward the end plate, by an internally positioned spring arrangement. It is necessary and desirable to seal the internally received filter cartridge against the end plate. This is typically achieved, by positioning of a gasket therebetween. Improvements are of general concern.

SUMMARY OF THE INVENTION

The invention is directed to a liquid filter apparatus. The preferred liquid filter apparatus comprises a housing cup, and end plate enclosing an end of the housing cup, a filter cartridge positioned within the housing cup, and a gasket positioned between the filter cartridge and the end plate. The end plate has a gasket-centering projection thereon, and includes at least one in-flow aperture therein. The gasket includes a centering depression positioned in engagement with the gasket centering projection of the end plate.

In some preferred arrangements, the gasket can be configured for containing a conditioner pellet within the arrangement, while allowing for the passage of liquid therethrough. This may be accomplished by, for example, providing a central aperture having an open area no greater than about 15% of the overall surface area of a central disk of the gasket.

In some preferred arrangements, the gasket can be configured for holding fuel, preventing the fuel from draining out of the filter when the engine is turned off. This may be accomplished by, for example, including a central stand pipe projection on the gasket in extension at least 25 cm into the filter cartridge.

In some preferred arrangements, the gasket can be configured for inhibiting unfiltered liquid from flowing outwardly (or back through) the inlet apertures. One gasket includes a flexible flange for accomplishing this. In addition, there is a central threaded aperture for sealing around threads which engage an outlet port during assembly.

Methods of constructing and assembly are described herein. The methods preferably use preferred constructions as described herein.

DETAILED DESCRIPTION

Figure 1:
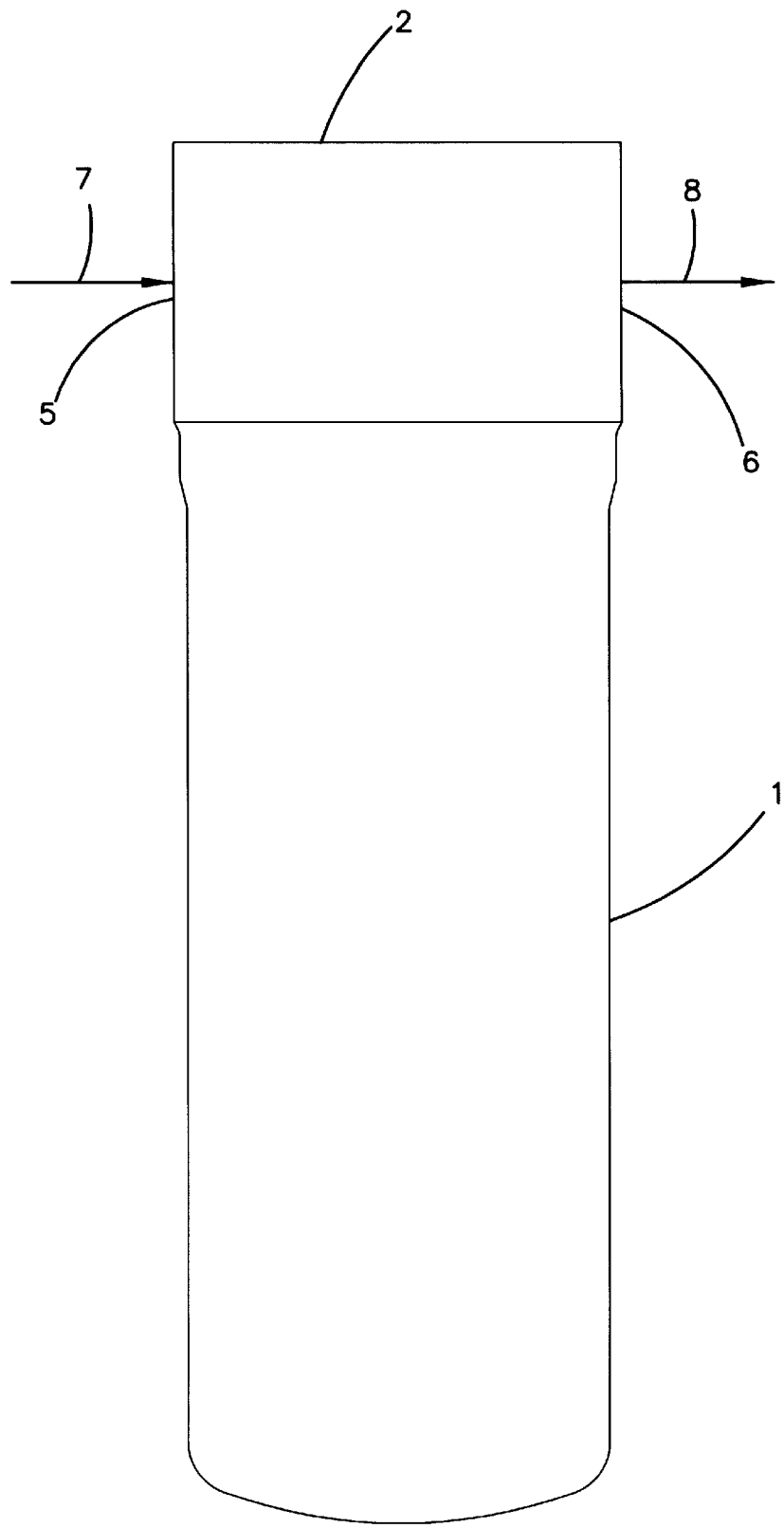
FIG. 1 is a schematic, side elevational view of a filter construction, according to the present invention, mounted in association with a typical filter head.
Figure 2:
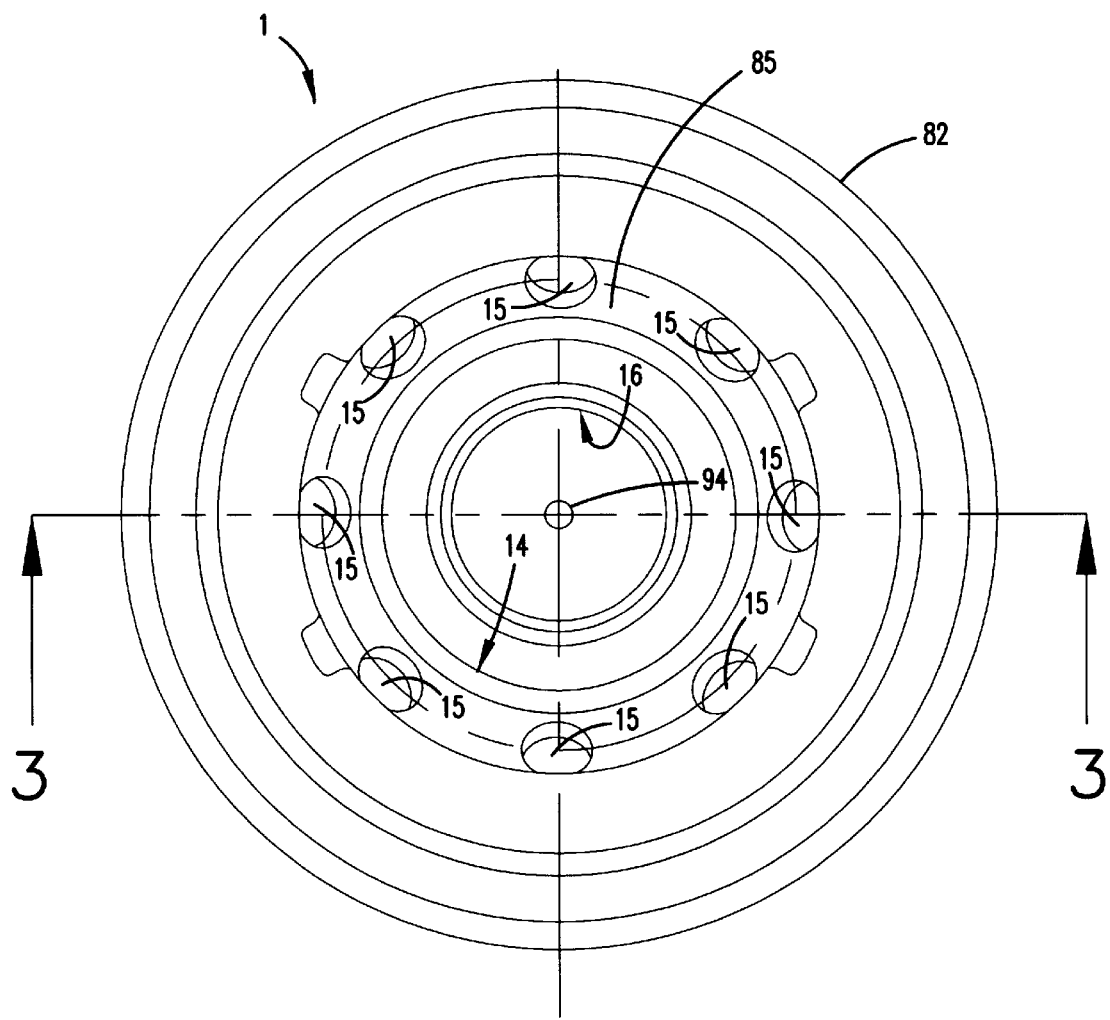
FIG. 2 is a schematic, top plan view of the filter construction depicted in FIG. 1.
Figure 3:
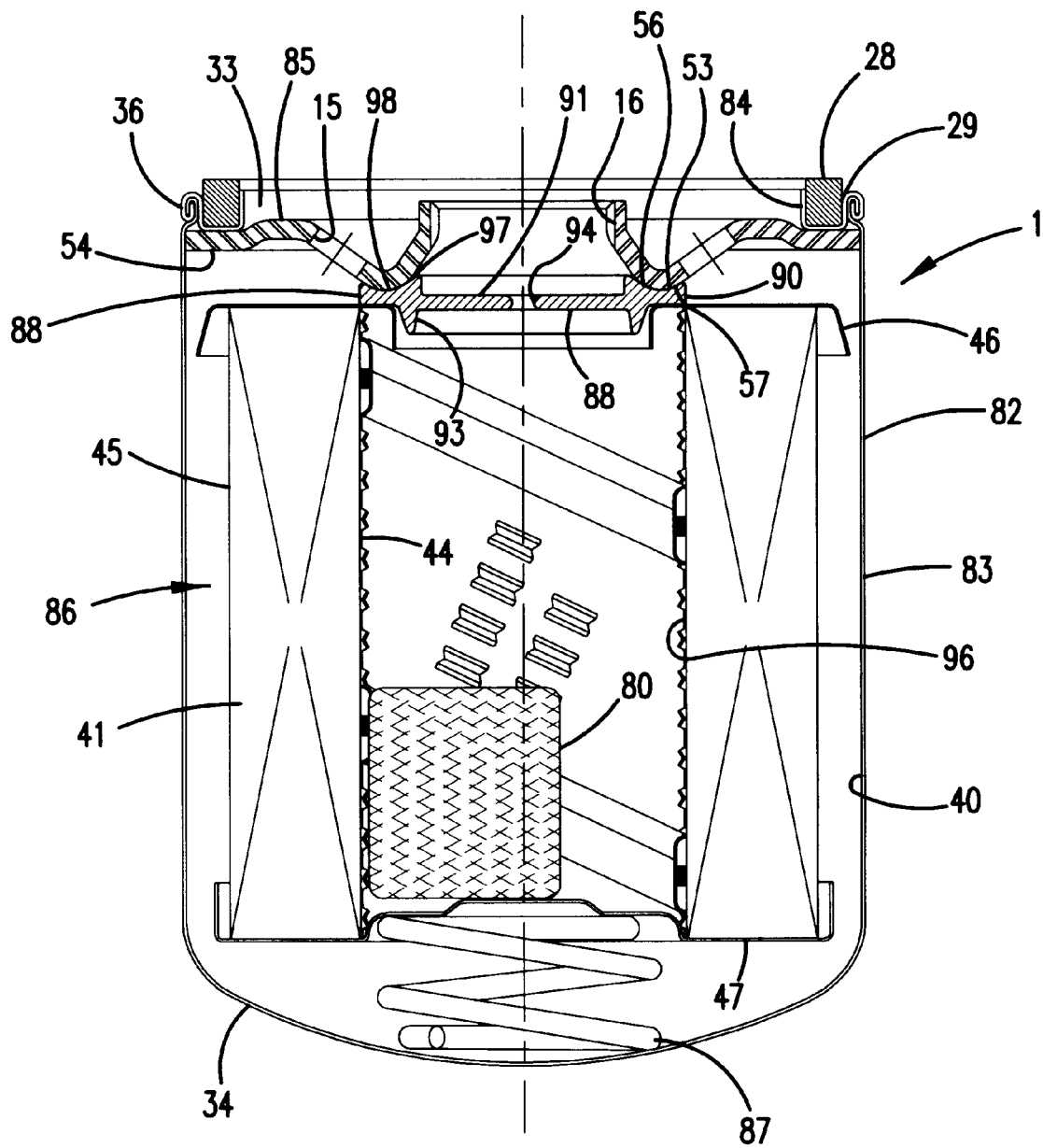
FIG. 3 is a cross-sectional view, taken along line 3—3, FIG. 2, of a first embodiment of the present invention.

The present invention concerns liquid filters. A typical liquid filter construction according to the present invention is depicted in FIGS. 1–3. In FIG. 1, a combination of a filter construction according to the present invention and a filter base or filter head is depicted. Referring to FIG. 1, the filter construction is depicted at reference number 1. Filter construction 1 is shown mounted on filter base 2. Although not required, typically filter constructions of the type illustrated in FIG. 1 are mounted on filter bases (such as filter base 2) by a threaded connection. When such is the case, filter constructions of the type indicated in FIG. 1 are generally referred to as "spin-on" filters.

Still referring to FIG. 1, filter base 2 includes liquid inlet port 5 and outlet port 6. In use, liquid to be filtered: (1) enters through inlet port 5 in the direction of arrow 7; (2) is directed through construction 1; and, (3) is then directed back into base 2 and outwardly therefrom through outlet port 6, in the direction of arrow 8. Ports 5 and 6 are generally appropriately constructed to be attached to fluid flow conduits, not depicted. In general, within filter construction 1, the liquid is directed through filter media, and filtering takes place.

In FIG. 2, a top plan view of the filter construction 1 is depicted. The particular construction 1 depicted is a "forward flow" construction. This means that during filtering, liquid flow is from an exterior of an enclosed filter element to an interior thereof. It will be understood from further descriptions below that techniques according to the present invention can be applied to "reverse flow" systems, i.e., filter systems in which filtering flow is from an interior volume of a filter element to an exterior.

Still referring to FIG. 2, filter construction 1 includes housing 82 and end plate 85. End plate 85 includes an inlet arrangement 14, shown in this instance as comprising a series of peripheral inlet apertures 15, and an outlet aperture arrangement, shown in this instance as comprising a single central port or aperture 16. During operation, inlet flow to housing 82 is directed through end plate 85 by means of inlet apertures 15. After it passes through a filter element received within housing 82, liquid flow leaves filter construction 1 through outlet port 16.

Of course a variety of inlet aperture and outlet aperture configurations can be used. The arrangement shown in FIG.

2, which uses a single central aperture 16, typically of a diameter of ⅜ in. to 3 in. (about 1–7.6 cm), and a plurality of radially evenly spaced inlet apertures 15 surrounding the outlet aperture, is typical and preferred. When such is the case, generally 4 to 12 evenly spaced inlet apertures are used, each having a diameter (if round), or other largest cross-sectional dimension (if not round), of about ⅛ in. to 1 in. (about 0.3–2.5 cm).

Attention is now directed to FIG. 3. In FIG. 3 the filter construction 1 of FIG. 2 is depicted in cross-section. The type of filter involved in FIG. 3 is a coolant filter. That is, it is used to filter such materials as ethylene glycol and water. With coolant filtering, it is sometimes desirable to also provide pellets of coolant conditioners, for example, anti-corrosives, to treat the coolant fluid. For the arrangement shown in FIG. 3, a chunk or pellet of coolant conditioner is depicted at 80. The cartridge will define an internal volume 96 in which conditioner 80 is positioned.

Referring to FIG. 3, filter construction 1 comprises housing 82, end plate 85, internally received filter cartridge 86, biasing mechanism 87 and gasket 88.

The arrangement depicted in FIG. 3 also includes external gasket 28. In general, external gasket 28 is positioned to be compressed between filter construction 1 and filter base 2, providing a fluid seal therebetween, when filter construction 1 is mounted on filter base 2. External gasket 28 is positioned at a gasket seat 29 of end ring 84. End ring 84 is spot welded to end plate 85 and is joined to housing 82 by way of a locking mechanism or roll type connection 36.

Still referring to FIG. 3, housing 82 comprises cup, receptacle or container 83 having a first open end 33 and an opposite end 34. End 34 is typically a closed end, as shown, in FIG. 3, but in some embodiments, it may include a port. Container 83 includes, as part of housing 82, an end ring 84 secured to container 83 and open end 33. As will be understood from further detailed description, end ring 84 is positioned to define gasket seat 29, and also to retain certain internal components within container 83.

For the filter construction 1 shown, housing cup or container 83 and end ring 84 are preferably each formed from sheet metal such as steel, and together comprise the housing 82. End ring 84 is secured to container 83 using roll type connection 36. Such a connection is well known in the liquid filtering art.

Still referring to FIG. 3, end plate 85, as described above, includes inlet apertures 15 therein. Liquid fluid flows from base 2, FIG. 1, into filter construction 1 and is directed through apertures 15.

Container 83 generally defines internal volume 40. Filter cartridge 86 is positioned, operably, within internal volume 40. By "operably" in this context it is meant that in normal, filtering use, cartridge 86 is positioned such that liquid is directed through it, in going from inlet 15 to outlet port 16.

Cartridge 86 generally comprises filter media 41. For the arrangement shown, cartridge 86 includes filter media 41, such as pleated media, e.g., cellulose, positioned between internal and external liners 44 and 45 respectively. The filter media 41 extends longitudinally, between first open end cap 46 and second closed end cap 47. The filter cartridge 86 may be of conventional design and construction.

Cartridge 86 is generally biased toward, and into sealing engagement with, end plate 85, by biasing mechanism 87. For the arrangement shown in FIG. 3, biasing mechanism 87 generally comprises a spring positioned between closed end cap 47 and closed end 34 of housing container 83. A biasing mechanism comprising a spring such as the coiled spring depicted is conventional for liquid filter arrangements and conventional ones may be utilized in association with the present invention.

Still referring to FIG. 3, positioned between filter cartridge 86 and end plate 85 is gasket 88. Gasket 88 preferably comprises a soft compressible seal, typically molded from a material such as nitrile rubber, configured and positioned to generate a desirable liquid seal between end plate 85 and filter cartridge 86. In this manner, liquid which enters housing interior 40 through apertures 15 normally (i.e., with the exception of any bypass arrangement that may be used) must pass through filter cartridge 86 before exiting through end plate outlet port 16.

In general, gasket 88 comprises two sections: an outer peripheral section 90 and a central disc 91. Preferably the gasket 88 is molded so peripheral section 90 and central disc 91 are integral with one another.

Central disc 91 occupies the interior 93 of peripheral section 90. Disc 91 extends across interior 93 and defines a central aperture 94. Preferably central aperture 94 has a largest cross-sectional dimension (diameter, if round) of no greater than about 0.25 in. (about 6 mm), typically 0.1 in. to 0.2 in. (about 2.5–5 mm). Thus, central aperture 94 is relatively small. As a result, chunks of conditioner pellet 80 cannot readily pass outwardly from internal volume 96 of filter cartridge 88, during use. Preferably, the largest cross-section dimension (diameter, if round) of peripheral section 90 is at least 3 in. typically about 1 in. to 2.5 in. Thus, the largest cross-section dimension of aperture 94 is no greater than about 10%, and typically, no greater than about 5–7% of the largest cross-sectional dimension of periphery 90. As compared to the outlet port 16, the largest cross-section dimension of aperture 94 is no greater than about 25%, and typically, no greater than about 15–20% of the largest cross-sectional dimension outlet port 16. As compared to a liquid flow aperture in the open end cap 46 of the filter cartridge, the largest cross-section dimension of aperture 94 is no greater than about 25% of the diameter of the liquid flow aperture. Preferably, central aperture 94 has an open area no greater than about 15%, typically about 15–10% of the overall surface area of the central disk 91.

Gasket 88 includes an outer surface 97 having a recess or trough 98 sized and shaped to snugly engage a projection or ridge 53 of the end plate 85. Still referring to FIG. 3, in cross-section end plate 85 includes gasket engaging projection or ridge 53. Ridge 53 is circular, and as a result, circumscribes outlet aperture 16. Ridge or projection 53 projects outwardly (downwardly in FIG. 3) from internal side 54 of end plate 85. Herein the term "internal side" in this context, refers to a side of end plate 85 directed toward internal volume 40 during use. The term "outwardly" in this context means a direction toward cartridge 86. Preferably, the cross-sectional shape of ridge 53 is defined by two wall sections 56 and 57 which engage one another at ridge 53 and project from ridge 53 (or apex) along an angle on the order of 60 degrees to 120 degrees relative to one another. Preferably ridge 53 is rounded somewhat, most preferably on a circular radius of about 0.15 in. to 0.30 in. (about 4–8 mm).

FIG. 3, then, represents a preferred arrangement for certain coolant filters or similar filters, wherein some loose pellet particulate material is positioned within an internal volume of the filter cartridge and wherein it is desired to have control over the ability of such material to flow outwardly from the filter construction into fluid flow passageways in the mechanical equipment involved. With a construction such as that shown in FIG. 3, each time the coolant filter 1 is changed, the coolant conditioner 80 could be replenished or changed also. That is, it is anticipated that typically the coolant conditioner 80 would be positioned within the coolant filter 81 during assembly (i.e., at manufacture). Thus, the end user would simply change the filter construction 1 in order to replenish or change the coolant conditioner 80.

Figure 8A:
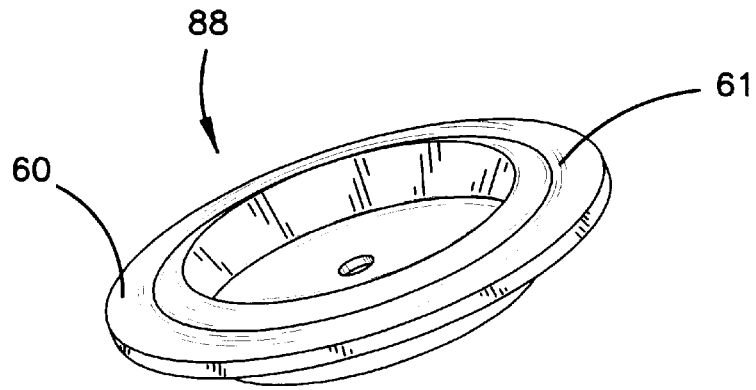
FIGS. 8A and 8B are perspective views of a gasket usable in the arrangement of FIG. 3 and shown in FIG. 7.
Figure 8B:
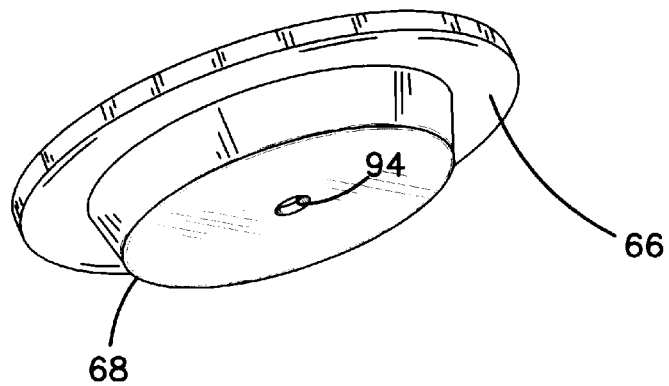

Referring now to FIGS. 8A and 8B, perspective views of the gasket 88 depicted in cross-section in FIG. 3 are provided. In FIGS. 8A and 8B, the gasket is depicted as it would appear when not under compression. Gasket 88 includes an outer surface 60. Herein in this context the term "outer surface" refers to a side of gasket 88 directed toward end plate 85 and away from interior volume 40, i.e. away from cartridge 86, during assembly. Outer surface 60 preferably includes a recess or trough 61 sized and shaped to snugly engage ridge 53, during assembly. Preferably through recess 61, then, is circular and circumscribes outlet aperture 16. It is preferably shaped to mate with projection 53.

Still referring to FIGS. 8A and 8B, gasket 88 also includes central aperture 94 therein. Recess 61 generally circumscribes central aperture 94. Central aperture 94 serves as an exit aperture for filtered liquid to pass from an interior volume 96 defined by cartridge 86, on a clean or filtered side thereof, outwardly through outlet aperture 16.

Gasket 88 further includes an inner surface 66. Inner surface 66 is generally defined by an opposite side of gasket 88 from outer surface 60. Inner surface 66 is the side of gasket 88 which faces cartridge 86, in use. Preferably inner surface 66 is sized and configured to engage cartridge 86, preferably by engaging with end cap 46, during use. In this manner, gasket 88 will be sealingly compressed between cartridge 86 and end plate 85, during use.

Figure 7:
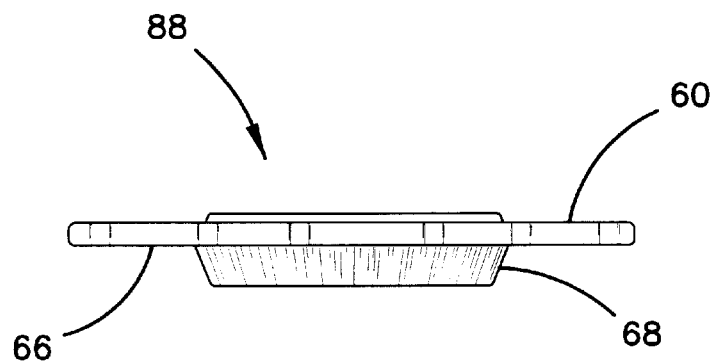
FIG. 7 is a side elevational view of a gasket of the type used in the arrangement of FIG. 3.

For the arrangement shown, gasket 88 includes an inwardly directed projecting ring 68, which projects outwardly from inner surface 66 and, during assembly, toward internal volume 40. Projecting ring 68 provides a means of centering or locating the gasket 88 onto the cartridge 86 during assembly. As can be seen in FIG. 7, projecting ring 68 is angled somewhat from the vertical. This slight angle also helps in centering.

FIG. 7 shows the gasket 88 in side elevational view, when not under compression.

Figure 5:
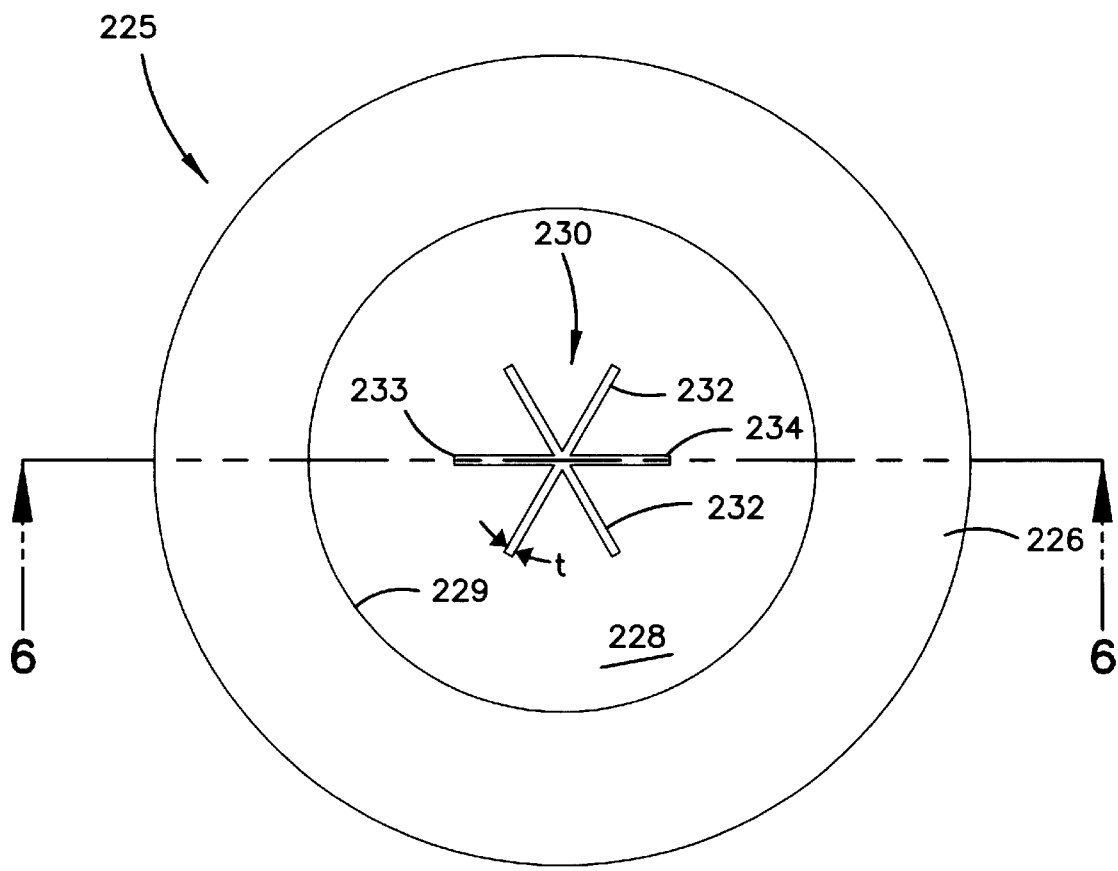
FIG. 5 is a top plan view of an alternative embodiment of a gasket similar to the gasket shown in the FIG. 3 embodiment.
Figure 6:
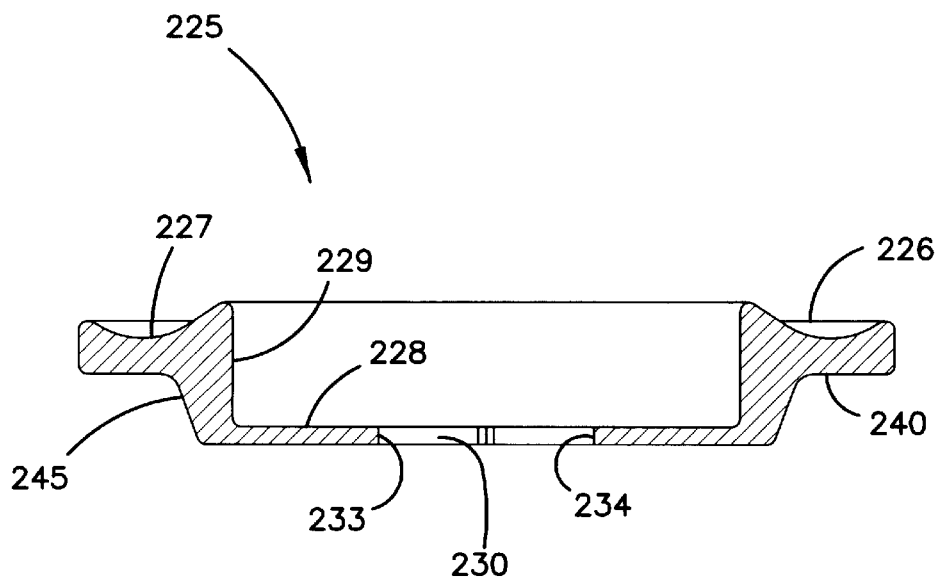
FIG. 6 is a cross-sectional view of the gasket shown in FIG. 5.

Attention is directed to FIGS. 5 and 6. In FIGS. 5 and 6, an alternate embodiment of gasket 88 is shown generally at 225. Gasket 225 includes an outer surface 226 preferably including recess or trough 227 sized and shaped to snugly engage ridge 53, during assembly. Opposite of outer surface 226 is inner surface 240 and an inwardly directed projecting ring 245, which projects outwardly from inner surface 240. Projecting ring 245 provides a means of centering or locating the gasket 225 onto the cartridge during assembly. A central disk 228 is defined by circular wall 229.

Gasket 225 also includes central aperture 230 therein. The largest cross-section dimension of central aperature 230 of gasket 225 is no greater than 25% of the diameter of the liquid flow aperature. Aperture 230 preferably includes a plurality of intersecting slits 232. In the embodiment shown in FIG. 5, there are three intersecting slits 232, to form an asterisk-shaped (i.e., * shaped) aperture, in top plan view. Preferably, the slits 232 are designed to permit the flow of liquid therethrough, but prohibit pieces of a conditioner pellet from falling through. In application, if the fluid flow deflects the triangular flaps between the slits 232 to create a flow passageway.

Each of slits 232 has a thickness t of about 0.0. In FIG. 5, the thickness has been exaggerated for clarity. Thus, in some embodiments, opposing surfaces of the slits 232 touch and engage.

The arrangement of FIGS. 5 and 6 helps solve problems during shipment. For example, during shipment, the conditioner pellet 80 can move and grate against the inner liner 44 to form pieces or powder. Some of the pieces or powder may shake out of the cartridge 86 and onto the packaging or shipping materials. The person installing the filter construction 1 may end up with the conditioner powder spilled onto his skin from the packaging materials. The slits 232 help to prevent conditioner powder or pieces from spilling out of the cartridge. This is because the conditioner powder is contained until fluid flow presses against the slits 232 to open the triangular flaps and thereby release the conditioner power.

Figure 4:
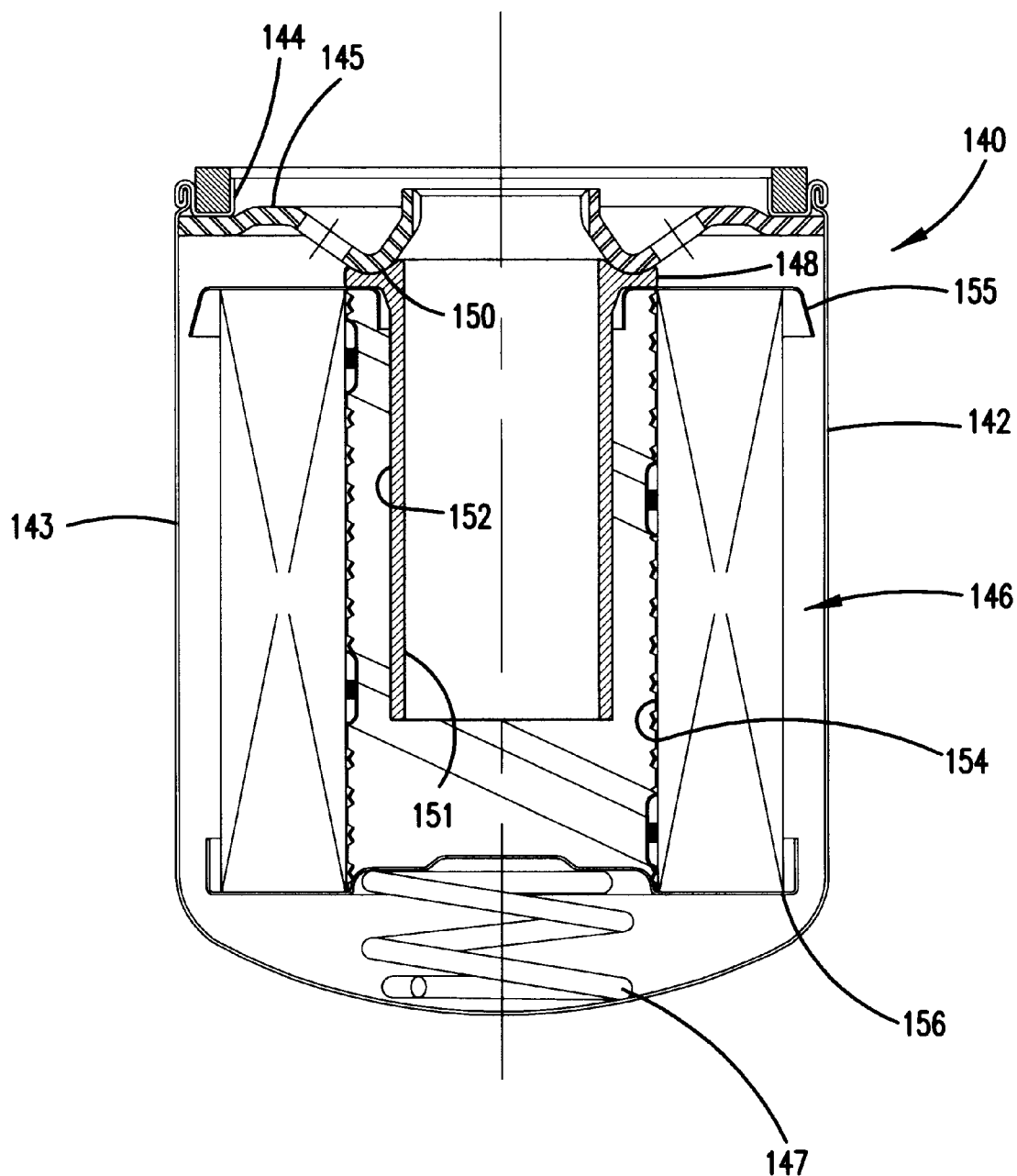
FIG. 4 is a cross-sectional view analogous to the one shown in FIG. 3, but of a second embodiment of the present invention.
Figure 9:
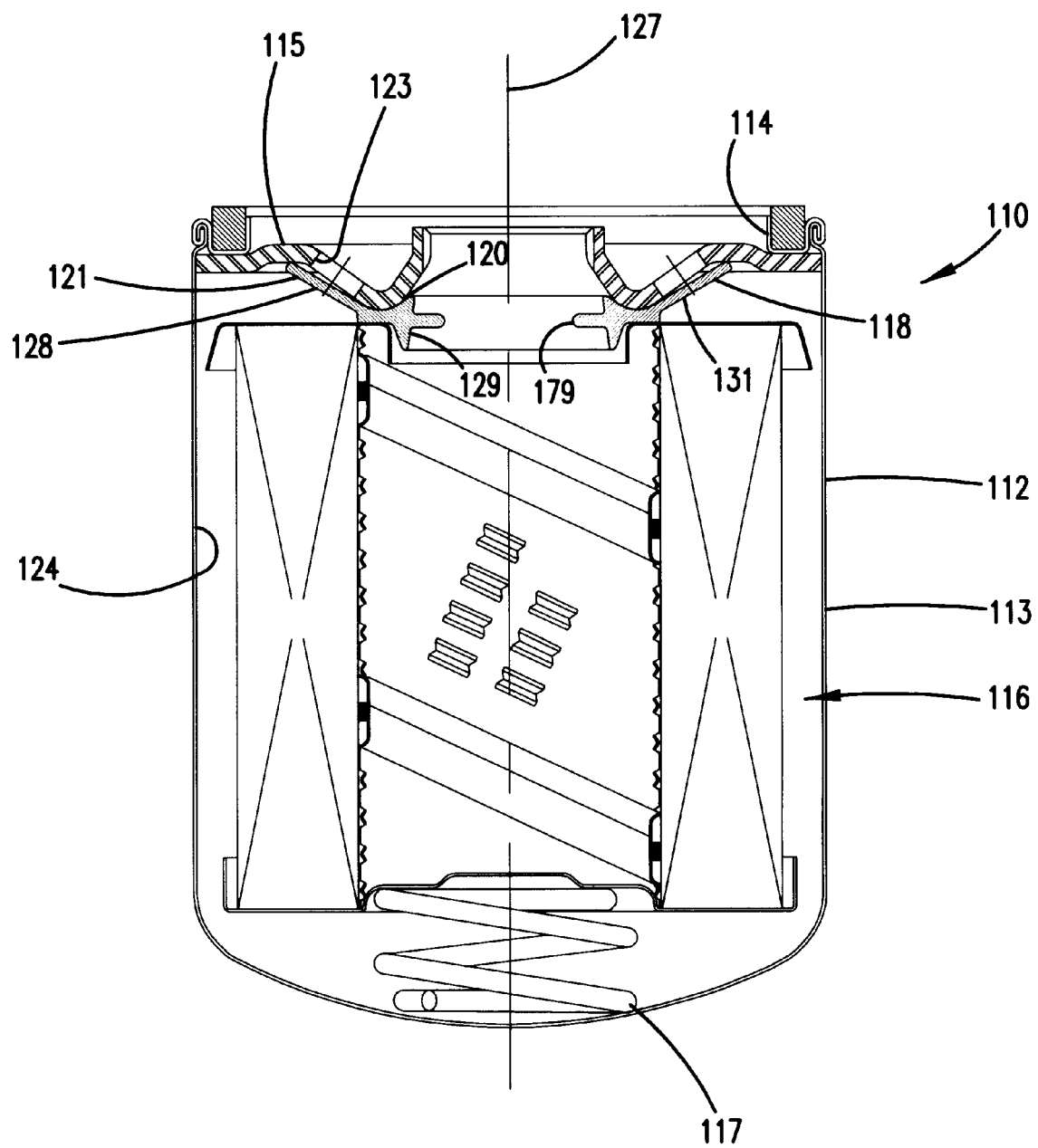
FIG. 9 is a cross-sectional view analogous to the one shown in FIG. 3, but of another embodiment of the present invention.
Figure 10:
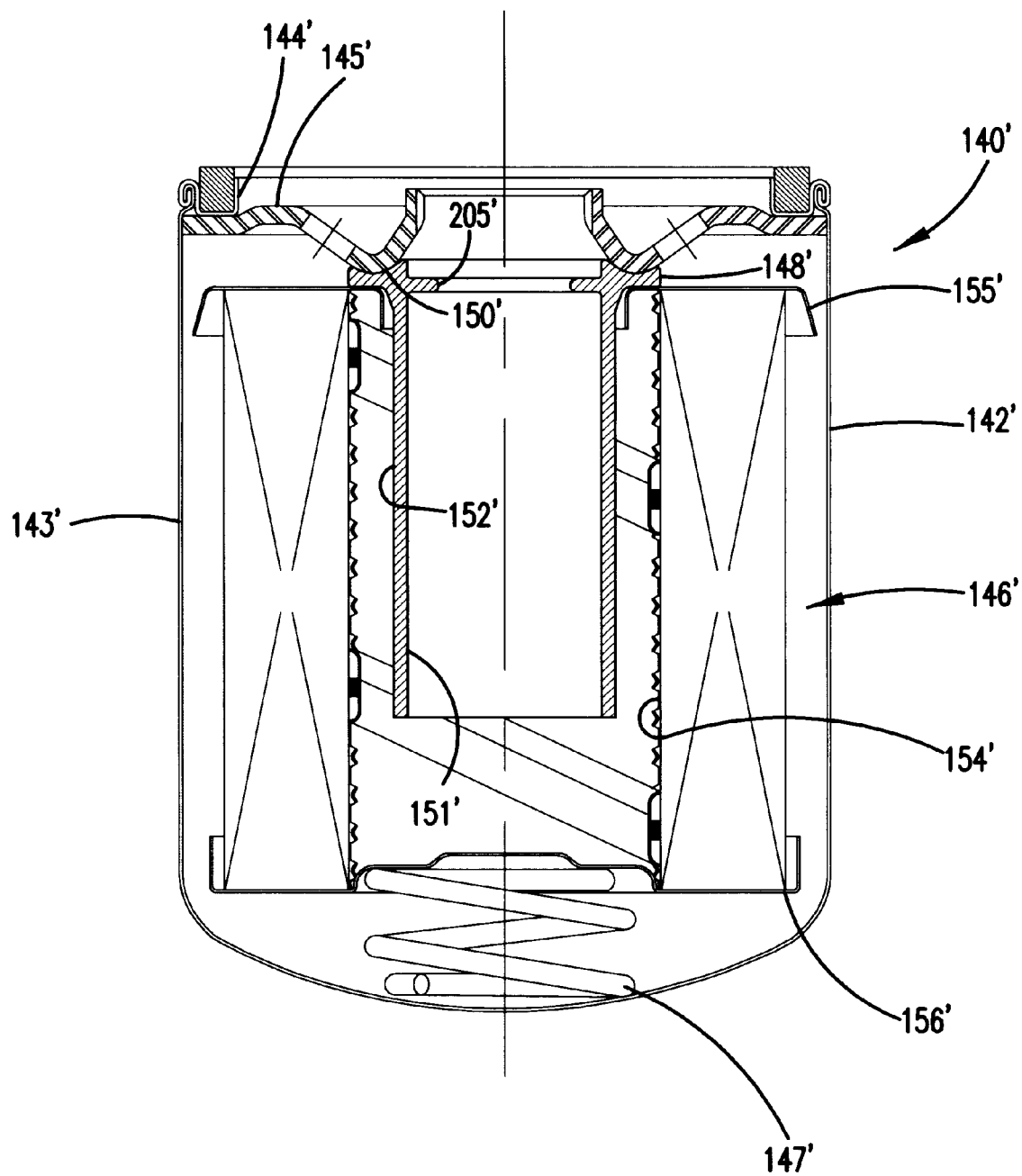
FIG. 10 is a cross-sectional view analogous to the one shown in FIG. 3, but of another embodiment of the present invention.

In FIGS. 4, 9, and 10, three advantageous alternate embodiments to the arrangement shown in FIGS. 1–3 are provided.

Attention is now directed to FIG. 4. In FIG. 4 a fuel or lube filter construction 140 is depicted. With fuel or lube filter constructions, it is sometimes desirable that the system be designed such that the fuel is prevented from draining out of the filter and emptying, which can lead to difficulty in starting the engine.

Referring to FIG. 4, fuel filter construction 140 comprises housing 142 which includes container 143 and end ring 144. Housing 142 further includes end plate 145, filter cartridge 146, spring 147 and gasket 148. The housing 142, end plate 145, filter cartridge 146 and spring 147 may be generally as described above in connection with the arrangement of FIGS. 1–3. When the filter cartridge 146 is specifically for use as a fuel filter, the media typically includes cellulose.

Gasket 148 includes sealing portion 150 and stand pipe portion 151. Sealing portion 150 may be generally configured analogously to gasket 88 from FIGS. 3 and 8. Stand pipe 151 comprises a tubular member 152 preferably formed integrally with sealing portion 150 and directed a distance of at least 25 cm into interior volume 154 of the filter cartridge 146. Preferably tubular member 152 extends at least 50%, more preferably, at least 75% along the interior length of interior volume 154 between opposite end caps 155 and 156.

In use, tubular member 152 will hold fuel, when the downstream engine is turned off.

Attention is now directed to FIG. 10. In FIG. 10, an alternate construction of the fuel or lube filter construction of FIG. 4 is shown generally at 140'. The fuel filter construction 140' of FIG. 10 is analogous to the construction of FIG. 4, with the exception of gasket 148'.

Gasket 148' preferably includes an outlet aperture 205'. In use, aperture 205' is for sealing around threads which engage outlet port 16 during installation. Incoming unfiltered fluid under pressure can enter the assembly between the base 2 and the filter construction 1 to get to the clean side of the filter construction 1. Aperture 205' forms a seal to prevent pressurized fluid from bypassing the filter.

Attention is now directed to the embodiment of FIG. 9. The arrangement depicted in FIG. 9 comprises a lube filter construction 110. That is, it is for filtering lubricating fluids. The features of FIG. 9 were developed such that unfiltered liquid is inhibited from flowing outwardly through (i.e. back through) inlet apertures 123 under either of two circumstances: (1) when forward flow pressure on the liquid is stopped while the element is mounted on machinery; or, (2) when the dirty filter is changed out.

Referring to FIG. 9, the lube filter construction 110 depicted includes housing 112 comprising container 113 and end ring 114. The filter construction 110 further includes end plate 115, filter cartridge 116, spring 117 and gasket 118. The housing 112 and end plate 115 may be generally as described above for FIGS. 1–3 and, indeed, for the specific arrangement depicted in FIG. 9, they are identical. The filter cartridge will generally be a preferred cartridge for filtering the liquid of concern, for the example of FIG. 9, the filter cartridge being a lube filter. In such circumstances the filter cartridge will generally comprise cellulose as the filter medium.

The gasket 118 will generally comprise a first portion 120 analogous in configuration to gasket 88, FIG. 3. Gasket 118, however, also contains an outer peripheral portion or second portion 121. The second portion 121 is a flexible frusto-conical portion, skirt, flange or diaphragm portion. This portion is sized and configured to overlap inlet apertures 123 in end plate 115, during use. Under inlet pressure, portion 121 is sufficiently flexible so that fluid flowing through inlet apertures 123 into interior 124 of cartridge 110 will deflect diaphragm portion 121 out of the way. However, back flow pressure from interior 124 toward inlet apertures 123 will tend to deflect diaphragm portion 121 into sealing or covering relation to inlet or in-flow apertures 123, inhibiting outward flow of fluid from filter construction interior 124.

A preferred gasket 118 of the type used in the arrangement of FIG. 9 would be molded nitrile rubber. Preferably the diaphragm portion or second portion 121 has a thickness of about 0.06 in. (about 1.5 mm) and a length of extension of about 0.25 in. to 0.75 in. (about 6–19 mm). Also preferably, the diaphragm extends at angle of about 40 degrees relative to a central axis, i.e., axis 127. Preferably the radius of the narrowest portion of diaphragm 121, i.e., portion 129 is about 50% of the radius of the outermost or largest portion 128. Preferably the radius of the first portion 128 is within the range of 1 in. to 2.5 in. (about 2.5–6.4 cm), the radius of the outermost portion 129 is within the range of 0.5 to 1.5 in. (about 1.3–3.8 cm).

For the arrangement shown, preferably diaphragm portion 121 is molded with reinforcement ribs on backside 131 thereof.

The first portion of 120 of gasket 118 is configured generally analogously to the gasket 24, FIG. 3. That is, gasket 118 comprises the same cross-sectional configuration as gasket 24, but for the addition of diaphragm portion 121 thereto. It is foreseen that preferably gasket 118 will be molded in a unitary construction with portions 120 and 121 integral with one another.

Preferably, first portion 120 defines an outlet aperture 179. In use, aperture 179 is for sealing threads which engage outlet port 16 during installation. Incoming unfiltered fluid under pressure can enter the assembly between the base and the filter construction 1 to get to the clean side of the filter construction 1. Aperture 179 forms a seal to prevent pressurized fluid from bypassing the filter construction 1.

METHODS OF ASSEMBLY

In general, arrangements such as those shown in the Figs. are assembled in the following manner:

The end plate such as that shown in FIG. 3 at 85, is provided. The end plate would include a gasket engaging projection or ridge such as that shown in FIG. 3 at 53.

A gasket is selected from amongst a plurality of different gaskets. For example, the gasket could include one as shown in FIG. 3 at 88, one shown in FIG. 4 at 148, one shown in FIG. 5 at 225, one shown in FIG. 9 at 118, and one shown in FIG. 10 at 148'. The gaskets are different in shape due to the differing functions provided based upon their intended application. The gasket will be selected based upon the filter assembly's ultimate end use. Each of the gaskets may generally include a centering depression for engaging with the end plate projecting ridge.

The gasket is positioned on the end plate by mating the centering depression of the gasket with the centering projection on the end plate.

A filter element is selected from amongst a plurality of different filter elements. The filter elements will vary based upon their intended use. Generally, the filter elements will vary by, for example, the type of media used. Examples of different filter elements include a lube filter, a fuel filter, and a coolant filter. The particular type of filter element is selected based upon the intended end use.

The selected filter element is positioned on the gasket/end plate assembly. For example, the aperture defined by the open end cap of the filter element receives inside of and is in mating engagement with the outwardly projecting ring of the gasket, such that the outwardly projecting ring of the gasket extends into the filter element interior.

A spring may be placed on the closed end of the filter element.

The housing cup is then placed over the end plate, gasket, filter element, and spring assembly. The cup and internal assembly are secured to each other by a roll type connection, such as that shown at 36, FIG. 3.

Of course, the steps of providing an end plate, selecting a gasket, and selecting a filter element may be done in any order.

Alternatively, the arrangements such as those shown in the Figs. may be assembled in the following manner:

The housing cup is provided. A spring is placed in the interior of the housing cup. A filter element is selected from amongst a plurality of different filter elements, as described above. The selected filter element is placed inside the cup and over and in engagement with the spring. A gasket is selected from amongst a plurality of different gaskets, as described above. The selected gasket is positioned in engagement with the filter element. Specifically, the projecting ring is placed to project inside of the open end cap of the filter element. An end plate having a gasket centering projection is placed inside the cup. The end plate is positioned so that the gasket centering projection engages the centering depression of the gasket. The end plate may be pre-welded or otherwise secured to the end ring, such that the end plate and end ring form a subassembly. After the end ring is placed over the end of the cup, a roll type connection may then be used to join the cup to the end ring.

Again, the steps of selecting a filter element and selecting a gasket may be done in any order.

It can be seen, then, that a preferred method of assembly is provided by the techniques according to the present invention. A principal difference among the various arrangements shown, is specific configurational features in the gaskets. Thus, the only major changes needed in the assembly operation, in order to accommodate the various design, concerns: selection of the particular filter cartridge; and, selection of the particular gasket.

In addition, the configuration of the gasket is such that it can easily be centered on the projection ridge 53 of the associated end plate 85. This will facilitate manufacture with an appropriate alignment of parts.

We claim:

1. A liquid filter apparatus comprising:
   (a) a housing cup;
   (b) an end plate enclosing an end of said housing cup;
      (i) said end plate having an inlet arrangement constructed and arranged to enable liquid to flow into said housing cup;
      (ii) said end plate having an outlet aperture arrangement constructed and arranged to enable liquid to flow out from said housing cup;
      (iii) said end plate having a gasket centering projection thereon;
   (c) a filter cartridge positioned within said housing cup;
      (i) said filter cartridge having a first end cap with a circular liquid flow aperture therein; said circular liquid flow aperture having a first diameter; and
   (d) a gasket positioned between said filter cartridge and said end plate;
      (i) said gasket including a centering depression positioned in engagement with said gasket centering projection of said end plate;
      (ii) said gasket defining a liquid flow aperture positioned in fluid flow alignment with said cartridge end cap liquid flow aperture; said gasket flow aperture having a diameter dimension no greater than 25% of said first diameter.

2. A liquid filter apparatus according to claim 1 wherein:
   (a) said gasket flow aperture is circular with a diameter no greater than about 0.2 inches.

3. A liquid filter apparatus according to claim 2 wherein:
   (a) said gasket comprises nitrile rubber.

4. A liquid filter apparatus according to claim 3 wherein:
   (a) said filter cartridge comprises a coolant filter cartridge.

5. A liquid filter apparatus according to claim 3 including:
   (a) a coolant conditioner pellet positioned within an interior volume of said filter cartridge.

6. A liquid filter apparatus according to claim 1 wherein:
   (a) said gasket flow aperture comprises a plurality of intersecting slits.

7. A liquid filter apparatus according to claim 6 wherein:
   (a) said gasket flow aperture is asterick-shaped.

8. A liquid filter apparatus according to claim 7 wherein:
   (a) said filter cartridge comprises a coolant filter cartridge.

9. A liquid filter apparatus according to claim 8 including:
   (a) a coolant conditioner pellet positioned within an interior volume of said filter cartridge.

* * * * *